United States Patent
Inoue et al.

(10) Patent No.: US 8,393,264 B2
(45) Date of Patent: Mar. 12, 2013

(54) PRESS MACHINE

(75) Inventors: Takeki Inoue, Fukuoka (JP); Yuji Shiozaki, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 397 days.

(21) Appl. No.: 12/726,354

(22) Filed: Mar. 18, 2010

(65) Prior Publication Data

US 2010/0242748 A1    Sep. 30, 2010

(30) Foreign Application Priority Data

Mar. 24, 2009    (JP) .............................. P. 2009-072657

(51) Int. Cl.
*B30B 15/14* (2006.01)
*B30B 15/28* (2006.01)

(52) U.S. Cl. ......... 100/48; 100/280; 72/20.1; 72/453.13
(58) Field of Classification Search .................... 100/43, 100/48, 49, 50, 259, 269.01, 347, 280, 282; 72/20.1, 21.5, 443, 350, 351, 453.13
See application file for complete search history.

(56) References Cited

U.S. PATENT DOCUMENTS

| | | | |
|---|---|---|---|
| 3,764,244 A * | 10/1973 | Hurley et al. | 425/78 |
| 5,304,906 A | 4/1994 | Arita et al. | |
| 5,440,213 A * | 8/1995 | Arita et al. | 318/568.11 |
| 5,621,289 A | 4/1997 | Doyama | |
| 2003/0116037 A1* | 6/2003 | Tanaka et al. | 100/282 |
| 2008/0134909 A1* | 6/2008 | Kohno et al. | 100/48 |

FOREIGN PATENT DOCUMENTS

| | | |
|---|---|---|
| JP | 03-196313 | 8/1991 |
| JP | 07-275971 | 10/1995 |
| JP | 11-254380 | 9/1999 |
| JP | 2001-259899 | 9/2001 |
| JP | 2007-054844 | 3/2007 |

* cited by examiner

*Primary Examiner* — Jimmy T Nguyen
(74) *Attorney, Agent, or Firm* — Ditthavong Mori & Steiner, P.C.

(57) ABSTRACT

A press machine includes a cushion shaft, a press shaft, a motor, and a motor control device. The cushion shaft is connected to a lower die. The press shaft is connected to an upper die and configured to press a workpiece between the upper die and the lower die in cooperation with the cushion shaft. The motor is configured to drive the upper die. The motor control device is configured to control the motor and includes a disturbance observer and an intrusion detector. The disturbance observer is configured to calculate an estimated disturbance value with respect to the motor based on a torque command and a motor velocity of the motor. The intrusion detector is configured to detect, based on the estimated disturbance value, a state of a foreign object between the press shaft and the cushion shaft.

16 Claims, 7 Drawing Sheets

PRESS MACHINE

CROSS REFERENCES TO RELATED APPLICATIONS

The present application claims priority under 35 U.S.C. §119 to Japanese Patent Application No. 2009-072657, filed Mar. 24, 2009. The contents of this application are incorporated herein by reference in their entirety.

BACKGROUND OF THE INVENTION

1. Field of the Invention

The present invention relates to a press machine.

2. Discussion of the Background

Japanese Unexamined Patent Application Publication No. 2007-054844, for example, discloses a press machine in which a detector senses electrical conductivity to reliably detect a foreign object which is present between a stripper and a workpiece or a die, and the press operation is stopped at the same time as the detection of the foreign object.

As another example, Japanese Unexamined Patent Application Publication No. 7-275971 discloses the following technique. An abnormality detector for monitoring torque in a transfer apparatus actually measures a torque value in normal operation for each particular transfer pattern and sets the actually measured value as a reference torque value for the relevant pattern. An allowable torque range is calculated to specify an upper limit torque value and a lower limit torque value, which are obtained by adding and subtracting a preset deviation value to and from the reference torque value, and the calculated allowable torque range is stored in a control device. Whenever actual operation is performed in accordance with the pattern, an actual torque value is measured and compared with the allowable torque range. Further, the moment when the actual torque value exceeds the allowable torque range is detected.

As still another example, Japanese Unexamined Patent Application Publication No. 03-196313 discloses the following technique. A disturbance estimation observer is disposed in consideration of that intrusion of a foreign object can be regarded as a disturbance imposed on a servomotor. When the amplitude of an estimated disturbance exceeds a set value defined in advance, the estimated disturbance is detected as an actual disturbance.

SUMMARY OF THE INVENTION

According to one aspect of the present invention, a press machine includes a cushion shaft, a press shaft, a motor, and a motor control device. The cushion shaft is connected to a lower die. The press shaft is connected to an upper die and configured to press a workpiece between the upper die and the lower die in cooperation with the cushion shaft. The motor is configured to drive the upper die. The motor control device is configured to control the motor and includes a disturbance observer and an intrusion detector. The disturbance observer is configured to calculate an estimated disturbance value with respect to the motor based on a torque command and a motor velocity of the motor. The intrusion detector is configured to detect, based on the estimated disturbance value, a state of a foreign object between the press shaft and the cushion shaft.

According to another aspect of the present invention, a press machine includes a cushion shaft, a press shaft, a motor, and a motor control device. The cushion shaft is connected to a lower die. The press shaft is connected to an upper die and configured to press a workpiece between the upper die and the lower die in cooperation with the cushion shaft. The motor is configured to drive the upper die through a mechanical mechanism generating a steady disturbance in the press machine. The steady disturbance originates in change in a moment of inertia of the mechanical mechanism. The motor control device is configured to supply electric power to the motor. The motor control device is configured to detect an abnormal state in the press machine by discriminating an abnormal disturbance originating in a foreign object between the press shaft and the cushion shaft, and the steady disturbance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
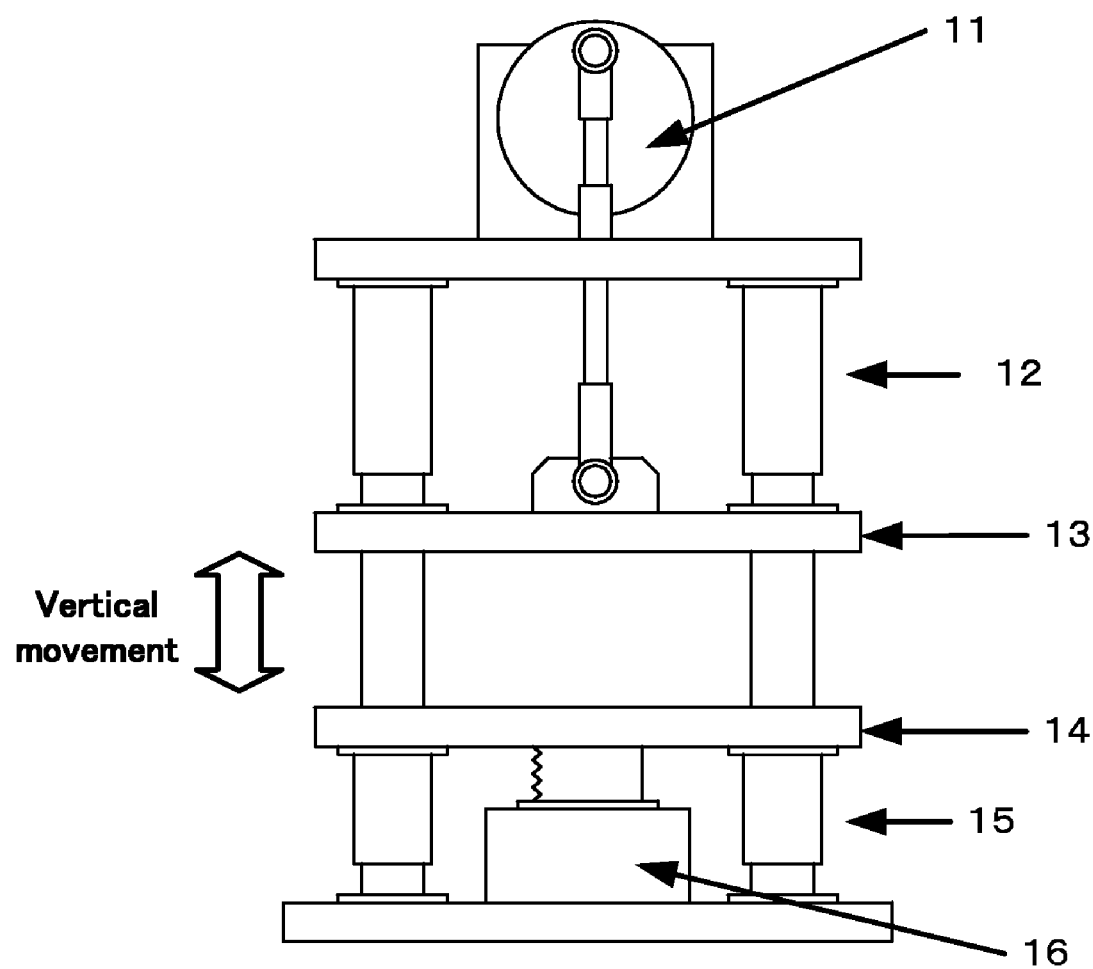
FIG. 1 is a schematic view of a press machine according to an embodiment of the present invention.

Embodiments will now be described with reference to the accompanying drawings, wherein like reference numerals designate corresponding or identical elements throughout the various drawings.

FIG. 1 is a schematic view of a press machine according to an embodiment of the present invention. Referring to FIG. 1, the press machine includes a crank mechanism 11, a press shaft 12, an upper die 13, a lower die 14, a cushion shaft 15, a rack and pinion 16, and a motor control device (not shown) such as a servo amplifier.

The crank mechanism 11 driven by a motor (servomotor) (not shown) is mounted to the upper die 13. The motor drives the upper die 13 through a mechanical mechanism, which includes a plurality of gears, in accordance with a command from the motor control device.

The press shaft 12 vertically moves the upper die 13 at a constant velocity by using the crank mechanism 11 under velocity control of the motor control device.

The cushion shaft 15 holds the lower die 14 at a constant position by using the rack and pinion 16 under position control of the motor control device. When the upper die 13 mounted to the press shaft 12 is moved downward, the upper die 13 reaches a position to press the lower die 14 under pressure, and thereafter the upper die 13 and the lower die 14 are both moved downward together. When the upper die 13 is moved upward, the lower die 14 is also moved upward to a commanded position through the rack and pinion 16.

Figure 2:
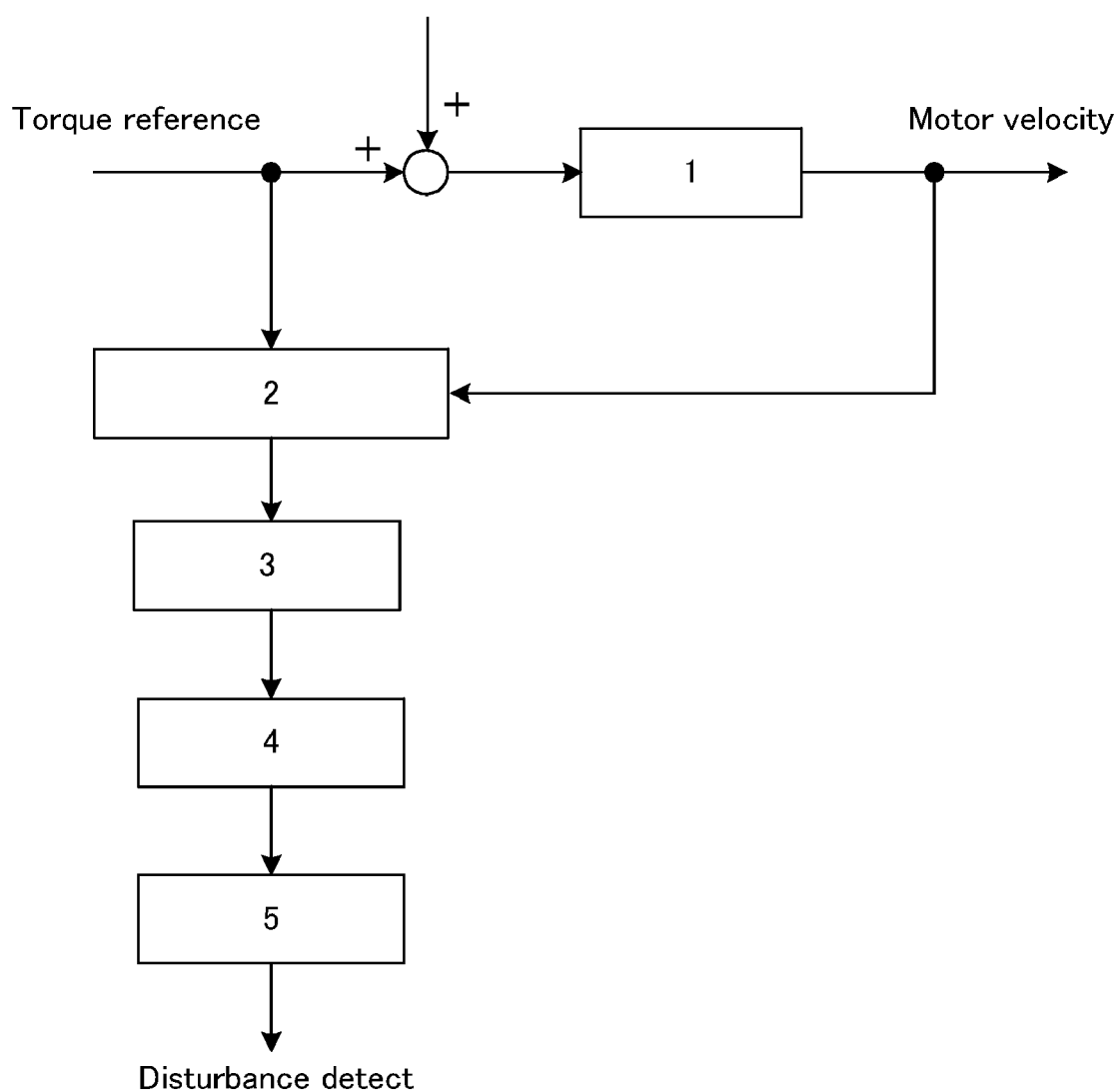
FIG. 2 is a block diagram illustrating a processing flow of disturbance detection in a press machine according to a first embodiment of the present invention.

FIG. 2 is a block diagram illustrating a processing flow of disturbance detection in the press machine according to a first embodiment of the present invention. Referring to FIG. 2, the motor control device (not shown) includes a disturbance observer 2, an absolute value calculator 3, an integrator 4, and a comparator 5. Also, the motor control device drives a motor (servomotor) 1.

Herein, a disturbance detected by the disturbance observer 2 means intrusion of a foreign object into the press machine (caused, for example, when a small foreign object is caught in or when a small chip of the workpiece is entrained, as described above).

Upon the detection of a disturbance, the motor control device stops the press machine and notifies a worker or another person of the fact that the intrusion of the foreign object is caused. After the worker or the other person has removed the foreign object, the operation of the press machine is resumed.

The motor control device inputs, to the disturbance observer 2, a torque command value output to the motor 1 and a rotational speed of the motor 1 (i.e., a motor velocity).

The disturbance observer 2 calculates an estimated disturbance value from the torque command value and the motor velocity, and then outputs the estimated disturbance value to the absolute value calculator 3.

The absolute value calculator 3 calculates an absolute value of the estimated disturbance value and outputs the calculated absolute value to the integrator 4.

During a period in which the crank mechanism 11 for the press shaft 12 of the press machine is rotated through a predetermined rotational angle, the integrator 4 continuously integrates the absolute value of the estimated disturbance value and outputs the integrated value to the comparator 5.

The comparator 5 compares a set value defined in advance with the output value of the integrator 4 and detects the presence of a disturbance if the output value of the integrator 4 exceeds the set value.

The motor velocity can be obtained by using an output signal of a position or velocity sensor (not shown) which is connected to the motor 1. The disturbance observer 2 for calculating and outputting the estimated disturbance value based on the torque command value and the motor velocity can be provided by using suitable one of known disturbance observers. Further, because the specifications of the press machine, such as a gear ratio between the mechanical mechanism using the plurality of gears to drive the crank mechanism 11 and the motor 1 are known in advance, one rotation of the crank mechanism 11 for the press shaft 12 of the press machine can be obtained based on the specifications (note that if the upper die 13 is directly driven by the motor 1 just through the crank mechanism 11, one rotation of the motor 1 corresponds to one rotation of the crank mechanism 11).

Figure 3:
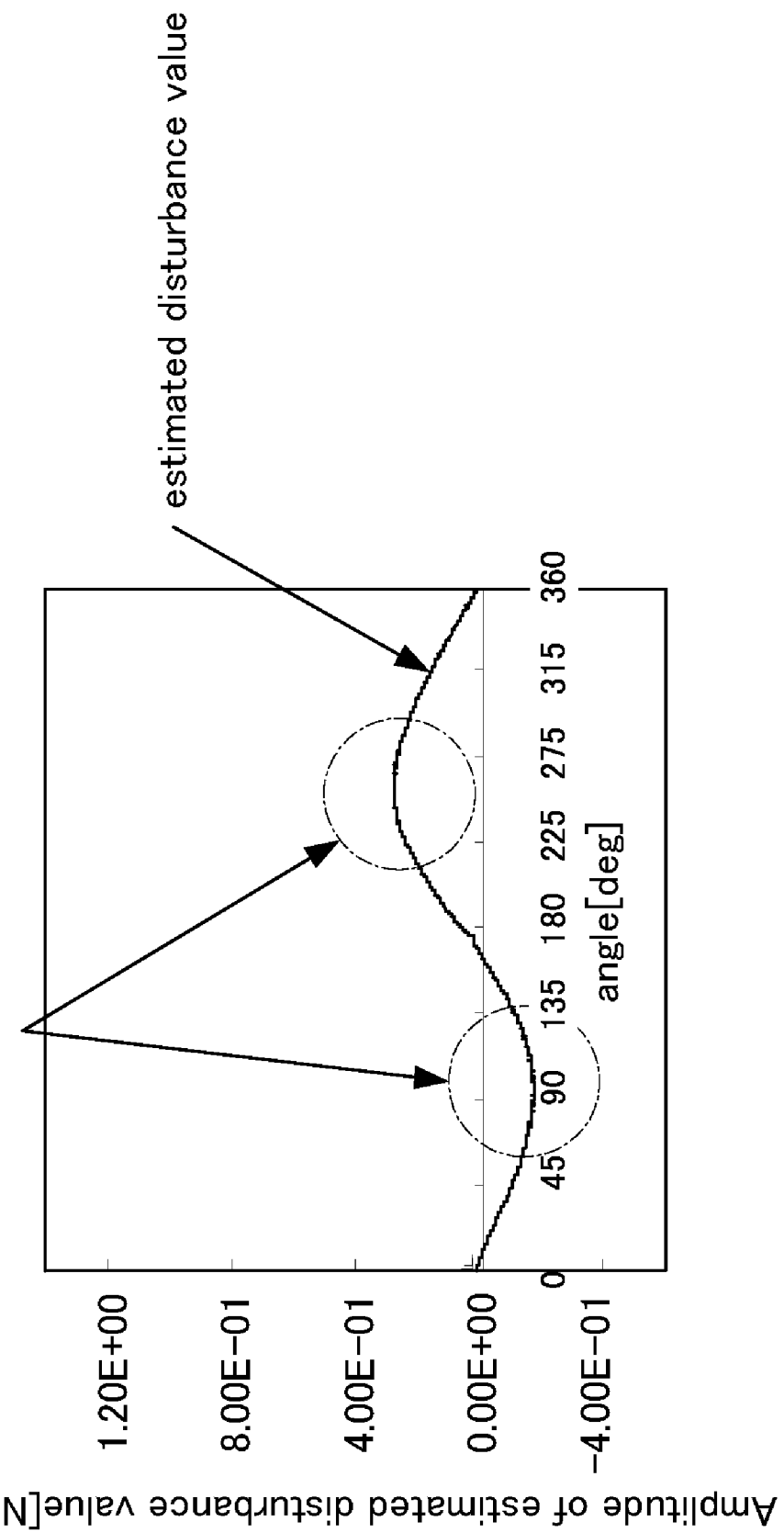
FIG. 3 is a graph illustrating an estimated disturbance waveform when a foreign object is not placed (caught) in the press machine according to the first embodiment of the present invention.

FIG. 3 is a graph illustrating an estimated disturbance waveform when a foreign object is not placed (caught) in the press machine according to the first embodiment of the present invention. In the graph of FIG. 3, the vertical axis represents the amplitude of the estimated disturbance value, and the horizontal axis represents the rotational angle (0° to 360°) of the crank mechanism 11 for the press shaft 12.

In the graph of FIG. 3, a solid line represents the estimated disturbance waveform, and a range covering substantially the entire graph along the horizontal axis corresponds to one rotation (360° in terms of angle) of the crank mechanism 11 for the press shaft 12.

Two circles indicated by one-dot-chain lines in the left and right sides of the graph represent zones in each of which a disturbance occurs due to change in the moment of inertia caused by the crank mechanism 11 for the press shaft 12. Such a disturbance has a maximum amplitude when the rotational angle of the crank mechanism 11 is 90° and 270°, for example.

Thus, in the press machine according to the first embodiment of the present invention, there is a steady disturbance when the intrusion of the foreign object is not caused (i.e., in the normal state).

For the reason that the steady disturbance illustrated in FIG. 3 may deflect to the positive and the negative from a reference which is set to zero of the amplitude of the estimated disturbance value, the absolute value calculator 3 calculates the absolute value of the estimated disturbance value and outputs the absolute value to the integrator 4, as described above, thereby detecting the intrusion of the foreign object.

In the case where the servomotor directly drives the upper die just through the crank mechanism 11, an angle of the crank mechanism 11 is 0° or 360° at the top dead center of the upper die and is 180° at the bottom dead center of the upper die.

Figure 4:
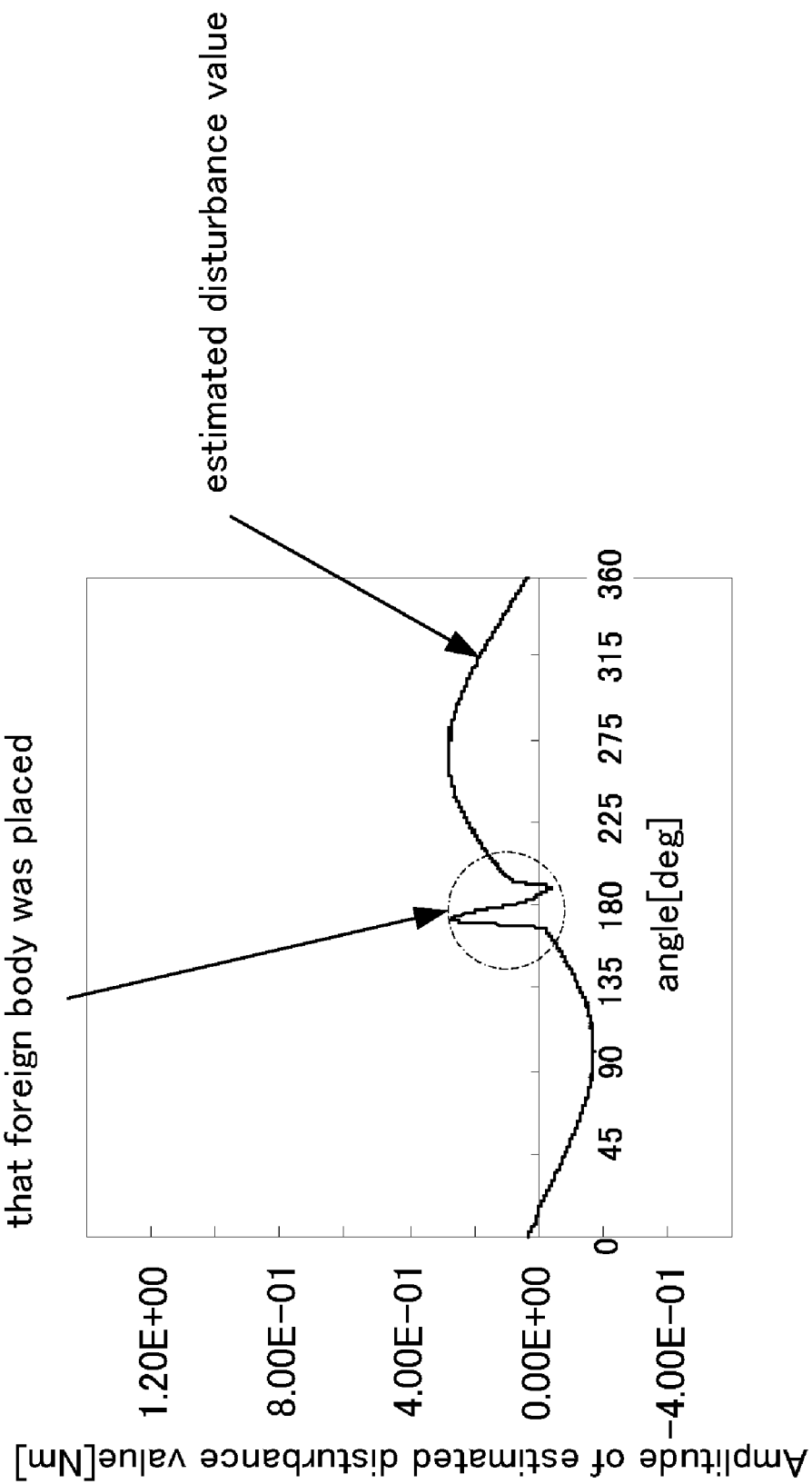
FIG. 4 is a graph illustrating an estimated disturbance waveform when a foreign object is placed (caught) in the press machine according to the first embodiment of the present invention.

FIG. 4 is a graph illustrating an estimated disturbance waveform when a foreign object is placed (caught) in the press machine according to the first embodiment of the present invention. In the graph of FIG. 4, the vertical axis represents the amplitude of the estimated disturbance value, and the horizontal axis represents the rotational angle (0° to 360°) of the crank mechanism 11 for the press shaft 12.

Also, in the graph of FIG. 4, a solid line represents the estimated disturbance waveform, and a range covering substantially the entire graph along the horizontal axis corresponds to one rotation (360° in terms of angle) of the crank mechanism 11 for the press shaft 12.

FIG. 4 represents the case when the operation of the press machine is set to the same operating conditions as those in the case of FIG. 3 and a small foreign object is intentionally placed on the lower die 14 so as to cause the intrusion of the foreign object in an artificial manner.

A circle indicated by a one-dot-chain line in a central area of FIG. 4 represents a zone where a disturbance occurs due to intrusion of the foreign object in a smaller amplitude than that of the steady disturbance (i.e., the disturbance originating in change in the moment of inertia of the crank mechanism 11) illustrated in FIG. 3.

The disturbance originating in the intrusion of the foreign object occurs over a range with its center corresponding to the time when the upper die 12 is positioned at the bottom dead center (i.e., when the rotational angle of the crank mechanism 11 is 180°).

Thus, the range of rotational angle of the crank mechanism 11 in which the disturbance originating in the intrusion of the foreign object occurs is limited to a certain angular range around 180° as a reference.

In the following, this embodiment is described on condition that the rotational angles 110° to 250° of the crank mechanism 11 for the press shaft 12 are a predetermined angular range of the crank mechanism 11 in which the disturbance originating in the intrusion of the foreign object occurs. Be it noted that the predetermined angular range can be properly defined as required.

Figure 5:
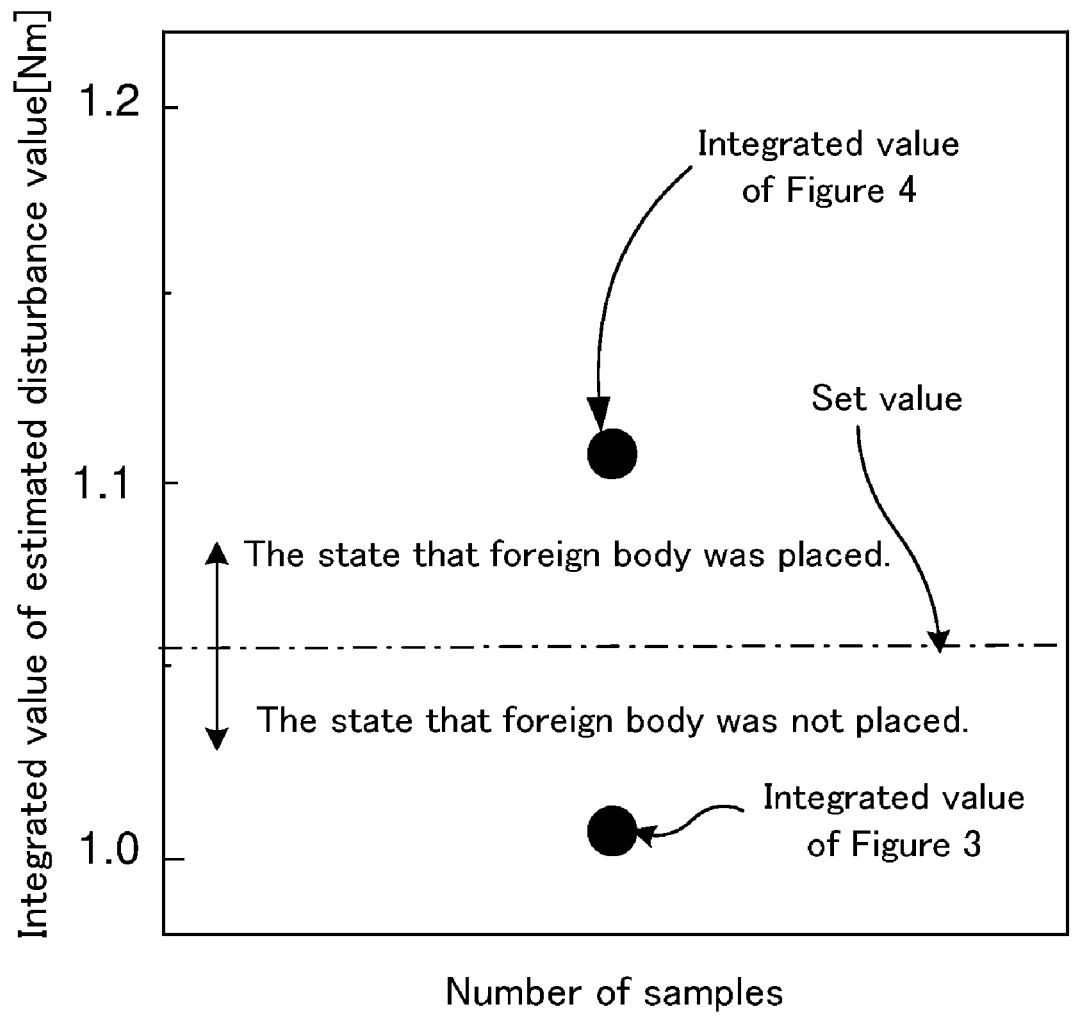
FIG. 5 is a graph illustrating an integrated value of an absolute value of an estimated disturbance value in the press machine according to the first embodiment of the present invention.

FIG. 5 is a graph illustrating an integrated value of the absolute value of the estimated disturbance value in the press machine according to the first embodiment of the present invention. In the graph of FIG. 5, the vertical axis represents the integrated value of the absolute value of the estimated disturbance value over a range in which the crank mechanism 11 mounted to the upper die 13 rotates from 110° to 250°, and the horizontal axis represents the total number of samples (sampling points) over the range in which the crank mechanism 11 rotates from 110° to 250°.

A black circle at an upper position in FIG. 5 represents a value obtained by, when the intrusion of the foreign object is caused (e.g., in the state illustrated in FIG. 4), continuously integrating the estimated disturbance value during a period in which the crank mechanism 11 for the press shaft 12 rotates from 110° to 250° (i.e., over the angular range from 110° to 250° of the crank mechanism 11 in which the disturbance originating in the intrusion of the foreign object occurs as illustrated in FIG. 4).

A black circle at a lower position in FIG. 5 represents a value obtained by, when the intrusion of the foreign object is not caused, namely when only the steady disturbance is generated, (e.g., in the state illustrated in FIG. 3), continuously integrating the estimated disturbance value during the period in which the crank mechanism 11 for the press shaft 12 rotates from 110° to 250°.

In each of the case where the intrusion of the foreign object occurs and the case where the intrusion of the foreign object does not occur (i.e., only the steady disturbance generates), data is sampled at intervals of 3 ms. In each case, therefore, the data is integrated during a period of 7.75 s over 2600 samples corresponding to the angular range from 110° to 250° of the crank mechanism 11.

In the press machine according to the first embodiment of the present invention, by continuously taking the absolute value of the estimated disturbance value and integrating the absolute value during the period in which the crank mechanism for the press shaft rotates from 110° to 250°, an apparent difference in the integrated value can be obtained with respect to a level, which is indicated, for example, by a one-dot-chain line in FIG. 5, between when only the steady disturbance is generated and when the intrusion of the foreign object is caused.

With the press machine according to the first embodiment of the present invention, therefore, the intrusion of the foreign object can be detected only when the intrusion of the foreign object is caused, by providing the level indicated by the one-dot-chain line in FIG. 5 as a set value that is to be preset in the comparator.

Figure 6:
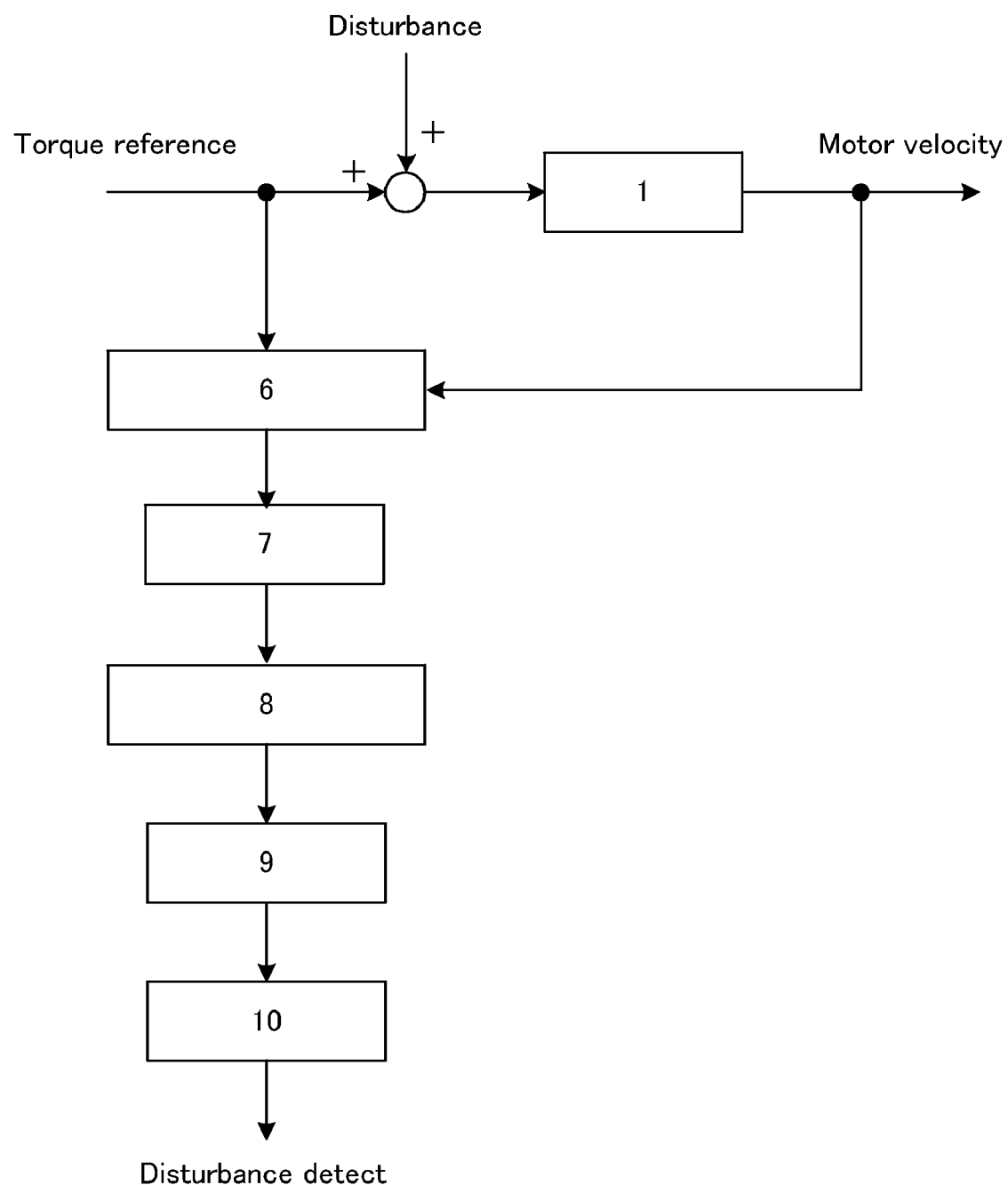
FIG. 6 is a block diagram illustrating a processing flow of disturbance detection in a press machine according to a second embodiment of the present invention.

FIG. 6 is a block diagram illustrating a processing flow of disturbance detection in the press machine according to a second embodiment of the present invention. Referring to FIG. 6, a motor control device (not shown) includes a disturbance observer 6, an absolute value calculator 7, a position coefficient processor 8, an integrator 9, and a comparator 10. Also, the motor control device drives a motor (servomotor) 1.

The second embodiment differs from the first embodiment (FIG. 2) in including the position coefficient processor 8 for receiving the absolute value of the estimated disturbance value, which is an output of the absolute value calculator 7, and the integrator 9 for integrating an output of the position coefficient processor 8. The other configuration is the same as that in the first embodiment, and hence a description thereof is omitted.

The position coefficient processor 8 assigns a weight to the estimated disturbance value depending on the position of the upper die 13 mounted to the press shaft 12 in relation to a possibility that the intrusion of the foreign object occurs, by multiplying the absolute value of the estimated disturbance value by a coefficient decided based on a certain function.

The certain function is set to provide such a coefficient as taking a value of 1 at the position where the upper die 13 mounted to the press shaft 12 is pressed against the lower die 14 (i.e., at the bottom dead center), and taking a value gradually decreasing from 1 as the upper die 13 mounted to the press shaft 12 is located farther away from the position where the upper die 13 is pressed against the lower die 14 (eventually, taking a value of 0 when the upper die 13 mounted to the press shaft 12 is positioned at the top dead center).

For example, the certain function is expressed by "1−|position where the upper die mounted to the press shaft is pressed for forming against the lower die−current rotational position of the crank mechanism for the press shaft|(absolute value)".

Thus, as the current rotational position of the crank mechanism for the press shaft is closer to the position where the upper die mounted to the press shaft is pressed for forming against the lower die, the position coefficient processor 8 assigns a larger weight to the estimated disturbance value because of a higher possibility that the intrusion of the foreign object may occur in relation to the operation of the press shaft.

On the other hand, as the current rotational position of the crank mechanism for the press shaft is farther away from the position where the upper die mounted to the press shaft is pressed for forming against the lower die, the position coefficient processor 8 assigns a smaller weight to the estimated disturbance value because of a lower possibility that the intrusion of the foreign object may occur in relation to the operation of the press shaft.

As a result, in detecting the intrusion of the foreign object, the second embodiment makes it possible to more easily determine a set value which is to be preset in the comparator 10 as described later, and to realize the detection with higher accuracy and higher reliability than the first embodiment.

Because the specifications of the press machine, such as a gear ratio between the mechanical mechanism using the plurality of gears to drive the upper die together with the press shaft and the servomotor are known in advance, the position where the upper die mounted to the press shaft is pressed for forming against the lower die can be previously set or confirmed before the press machine starts the normal operation. Therefore, the above-described processing in the position coefficient processor 8 can be executed without problems.

During a period in which the crank mechanism 11 for the press shaft 12 rotates through 360°, the integrator 9 continuously integrates an output value of the position coefficient processor 8 and outputs an integrated value to the comparator 10.

The comparator 10 compares a set value defined in advance with the output value of the integrator 9 and detects the presence of a disturbance if the output value of the integrator 9 exceeds the set value.

Figure 7:
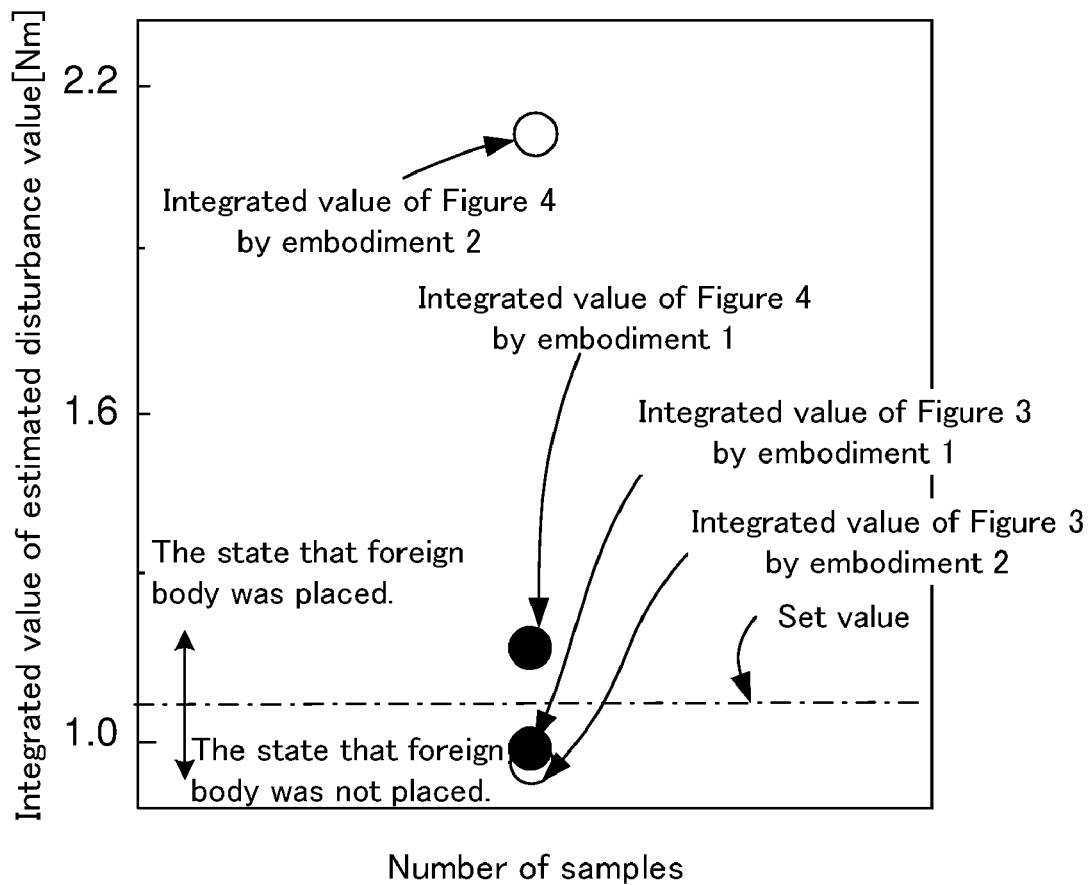
FIG. 7 is a graph illustrating an integrated value of an absolute value of an estimated disturbance value in the press machine according to the second embodiment of the present invention.

FIG. 7 is a graph illustrating an integrated value of the absolute value of the estimated disturbance value in the press machine according to the second embodiment of the present invention. In the graph of FIG. 7, the vertical axis represents the integrated value of the absolute value of the estimated disturbance value over the range in which the crank mechanism 11 for the press shaft 12 rotates from 110° to 250°, and the horizontal axis represents the total number of samples (sampling points) over the range in which the crank mechanism 11 for the press shaft 12 rotates from 110° to 250°.

A white circle at a lower position in FIG. 7 represents a value obtained by, when the intrusion of the foreign object is not caused, namely when only the steady disturbance is generated, (e.g., in the state illustrated in FIG. 3), continuously integrating the output resulting from executing the position coefficient processing according to the second embodiment on the estimated disturbance value during the period in which the crank mechanism 11 rotates from 110° to 250°.

A white circle at an upper position in FIG. 7 represents a value obtained by, when the intrusion of the foreign object is caused (e.g., in the state illustrated in FIG. 4), continuously integrating the output resulting from executing the position coefficient processing according to the second embodiment on the estimated disturbance value during the period in which the crank mechanism 11 for the press shaft 12 rotates from 110° to 250° (i.e., over the angular range from 110° to 250° of the crank mechanism 11 in which the disturbance originating in the intrusion of the foreign object occurs as illustrated in FIG. 4).

In FIG. 7, as in FIGS. 3 and 4, data is sampled at intervals of 3 ms. In any of the two cases where the intrusion of the foreign object occurs and it does not occur, therefore, the data is integrated during a period of 7.75 s over 2600 samples corresponding to the angular range from 110° to 250° of the crank mechanism 11.

Black circles in FIG. 7 are the same as those in FIG. 5 representing the first embodiment. The black circles are plotted in FIG. 7 to graphically indicate a more significant advantage of the second embodiment in a comparative manner between the first embodiment and the second embodiment.

Thus, in the second embodiment, a more apparent difference in the integrated value can be obtained than in the first embodiment between when only the steady disturbance is generated and when the intrusion of the foreign object is caused. Further, the set value to be preset in the comparator can be more easily defined, and the intrusion of the foreign object can be detected only when the intrusion of the foreign object is caused.

As seen from comparing FIG. 5 and FIG. 7, the set value to be preset in the comparator can be more easily defined because of a larger difference in the integrated value between when only the steady disturbance is generated and when the intrusion of the foreign object is caused.

While, in the first and second embodiments described above, the motor control device detects an abnormal disturbance (i.e., the state in which the foreign object is caught) by comparing the integrated value of the absolute value of the estimated disturbance value with the set value defined in advance, the motor control device may merely execute sampling comparison for the integrated value of the absolute value of the estimated disturbance value.

For example, it is possible to make sampling (to store sampled data) for the absolute value of the integrated value of the estimated disturbance value per control cycle and to determine the presence of an abnormality based on change between the integrated value of the estimated disturbance value, which is obtained by the current sampling, and the integrated value of the estimated disturbance value, which has been obtained by sampling in the cycle just preceding or several cycles before.

Also, while in the first and second embodiments the control device has been described as a servo amplifier or the like for "supplying electric power to the motor" (such as for receiving commands regarding a position, velocity, torque, etc. from, e.g., an upper-level device, executing control calculations regarding the position, velocity, torque, etc., and outputting voltages or currents corresponding to the received commands), the above-described disturbance observer and intrusion detector may be configured to have similar functions.

As another example, those functions can also be provided by an upper-level device such as a controller capable of generating commands.

Further, in the second embodiments described above, the function used in the position coefficient processor for applying a weight to the estimated disturbance value depending on the position of the upper die mounted to the press shaft with respect to the generation of the intrusion of the foreign object is set to provide such a coefficient as taking a value of 1 at the position where the upper die mounted to the press shaft is pressed against the lower die (i.e., at the bottom dead center), and taking a value gradually decreasing from 1 as the upper die mounted to the press shaft is located farther away from the position where the upper die is pressed against the lower die (eventually, taking a value of 0 when the upper die mounted to the press shaft is positioned at the top dead center). Thus, the certain function is expressed, for example, by "1−|position where the upper die mounted to the press shaft is pressed for forming against the lower die−current rotational position of the crank mechanism for the press shaft|(absolute value)". It is, however, a matter of course that a practically usable function is not limited to the above-mentioned function and some other suitable function capable of applying a weight to the estimated disturbance value depending on the motor position (the position of the upper die) can also be used.

According to the first embodiment of the present invention, even when a steady disturbance (such as a reaction force due to change in the moment of inertia caused by the crank mechanism for converting a rotary motion to a reciprocating motion) is imposed on the press shaft of the press machine, a disturbance having a smaller amplitude than that of the steady disturbance or a disturbance varying in a shorter vibration cycle than that of the steady disturbance can be reliably detected, which is caused due to the intrusion of the foreign object (such as, for example, when the foreign object is caught in or when a small chip of the workpiece is entrained), without arranging a sensor or the like dedicated for detecting the intrusion of the foreign object. It is further possible to realize reduction in the price and the size of the press machine, and to increase reliability thereof.

Also, according to the first embodiment of the present invention, upon detecting the intrusion of the foreign object, the press machine can be stopped at once and the state in which the foreign object is caught between the press shaft and the cushion shaft can be notified to the worker or another person. After the worker or the other person has eliminated the state in which the foreign object is caught therebetween, the press machine can be safely operated again. In addition, the presence of an abnormality can be easily determined.

According to the second embodiment of the present invention, in addition to the above-described advantages of the first embodiment of the present invention, the set value to be preset in the comparator in the final stage can be more easily defined and the intrusion of the foreign object can be detected with higher accuracy and higher reliability.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A press machine comprising:
    a cushion shaft connected to a lower die;
    a press shaft connected to an upper die and configured to press a workpiece between the upper die and the lower die in cooperation with the cushion shaft;

a motor configured to drive the upper die; and
a motor control device configured to control the motor and comprising:
  a disturbance observer configured to calculate an estimated disturbance value with respect to the motor based on a torque command and a motor velocity of the motor; and
  an intrusion detector configured to detect, based on the estimated disturbance value, a state of a foreign object between the press shaft and the cushion shaft,
wherein the motor control device is configured to determine an integrated value of an absolute value of the estimated disturbance value, and
wherein the motor control device is configured to determine that the foreign object is caught when the integrated value exceeds a set value defined in advance.

2. The press machine according to claim 1, wherein the intrusion detector comprises
an absolute value calculator configured to receive the estimated disturbance value and to calculate the absolute value of the estimated disturbance value,
an integrator configured to integrate the absolute value of the estimated disturbance value during a period in which the upper die is moved over a predetermined zone within a movable range of the upper die, and
a comparator configured to receive an output of the integrator, to compare an output of the integrator with the set value defined in advance, and to determine whether the foreign object is present, and
wherein when the output of the integrator exceeds the set value defined in advance, the comparator determines that the foreign object is caught.

3. The press machine according to claim 1, wherein the intrusion detector comprises
an absolute value calculator configured to receive the estimated disturbance value and to calculate the absolute value of the estimated disturbance value,
a position coefficient processor configured to receive the absolute value of the estimated disturbance value and to assign a weight to the estimated disturbance value depending on a position of the upper die,
an integrator configured to integrate an output of the position coefficient processor during a period in which the upper die is moved over a predetermined zone within a movable range of the upper die, and
a comparator configured to receive an output of the integrator, to compare the output of the integrator with the set value defined in advance, and to determine whether the foreign object is caught, and
wherein when the output of the integrator exceeds the set value defined in advance, the comparator determines that the foreign object is caught.

4. The press machine according to claim 3,
wherein the position coefficient processor has a function that changes a coefficient depending on a position of the upper die within a vertically movable range of the upper die such that the coefficient takes a value of 1 when the upper die is positioned at a bottom dead center, and takes a value gradually decreasing from 1 as the upper die is positioned farther away from the bottom dead center, and
wherein the position coefficient processor outputs a value calculated as a product of the coefficient decided based on the function and the absolute value of the estimated disturbance value.

5. The press machine according to claim 1, wherein the intrusion detector comprises
an absolute value calculator configured to receive the estimated disturbance value and to calculate the absolute value of the estimated disturbance value,
an integrator configured to integrate the absolute value of the estimated disturbance value during a period in which the upper die is moved over a predetermined zone within a movable range of the upper die, and
a comparator configured to sample an output of the integrator per predetermined time, to compare a current sampling value with a sampling value in a just preceding cycle or a further before cycle, and to determine, based on a comparison result, whether the foreign object is caught,
wherein when the output of the integrator exceeds the set value defined in advance, the comparator determines that the foreign object is caught.

6. The press machine according to claim 1, wherein the intrusion detector comprises
an absolute value calculator configured to receive the estimated disturbance value and calculating the absolute value of the estimated disturbance value,
a position coefficient processor configured to receive the absolute value of the estimated disturbance value and to assign a weight to the estimated disturbance value depending on a position of the upper die,
an integrator configured to integrate an output of the position coefficient processor during a period in which the upper die is moved over a predetermined zone within a movable range of the upper die, and
a comparator configured to sample an output of the integrator per predetermined time, to compare a current sampling value with a sampling value in a just preceding cycle or a further before cycle, and to determine, based on a comparison result, whether the foreign object is caught, and
wherein when the output of the integrator exceeds the set value defined in advance, the comparator determines that the foreign object is caught.

7. The press machine according to claim 6,
wherein the position coefficient processor has a function that changes a coefficient depending on a position of the upper die within a vertically movable range of the upper die such that the coefficient takes a value of 1 when the upper die is positioned at a bottom dead center, and takes a value gradually decreasing from 1 as the upper die is positioned farther away from the bottom dead center, and
wherein the position coefficient processor outputs a value calculated as a product of the coefficient decided based on the function and the absolute value of the estimated disturbance value.

8. The press machine according to claim 1, wherein when the motor control device detects that the foreign object is caught, the press machine outputs, to an exterior, information indicating that the foreign object is caught.

9. A press machine comprising:
a cushion shaft connected to a lower die;
a press shaft connected to an upper die and configured to press a workpiece between the upper die and the lower die in cooperation with the cushion shaft;
a motor configured to drive the upper die through a mechanical mechanism generating a steady disturbance in the press machine, the steady disturbance originating in change in a moment of inertia of the mechanical mechanism; and
a motor control device configured to supply electric power to the motor and configured to detect an abnormal state in the press machine by discriminating an abnormal disturbance originating in a foreign object between the press shaft and the cushion shaft, and the steady disturbance, wherein the motor control device comprises a disturbance observer configured to calculate an estimated disturbance value with respect to the motor based on a torque command and a motor velocity of the motor, wherein the motor control device is configured to determine an integrated value of an absolute value of the estimated disturbance value, and wherein the motor control device is configured to determine that the foreign object is caught when the integrated value exceeds a set value defined in advance.

10. The press machine according to claim 9, wherein the motor control device comprises an absolute value calculator configured to receive the estimated disturbance value and to calculate the absolute value of the estimated disturbance value, an integrator configured to integrate the absolute value of the estimated disturbance value during a period in which the upper die is moved over a predetermined zone within a movable range of the upper die, and a comparator configured to receive an output of the integrator, to compare the output of the integrator with the set value defined in advance, and to determine that the abnormal disturbance is present when the output of the integrator exceeds the set value.

11. The press machine according to claim 9, wherein the motor control device comprises an absolute value calculator configured to receive the estimated disturbance value and to calculate the absolute value of the estimated disturbance value, a position coefficient processor configured to receive the absolute value of the estimated disturbance value and to assign a weight to the estimated disturbance value depending on a position of the upper die, an integrator configured to integrate an output of the position coefficient processor during a period in which the upper die is moved over a predetermined zone within a movable range of the upper die, and a comparator configured to receive an output of the integrator, to compare the output of the integrator with the set value defined in advance, and to determine that the abnormal disturbance is present when the output of the integrator exceeds the set value.

12. The press machine according to claim 11, wherein the position coefficient processor has a function that changes a coefficient depending on a position of the upper die within a vertically movable range of the upper die such that the coefficient takes a value of 1 when the upper die is positioned at a bottom dead center, and takes a value gradually decreasing from 1 as the upper die is positioned farther away from the bottom dead center, and wherein the position coefficient processor outputs a value calculated as a product of the coefficient decided based on the function and the absolute value of the estimated disturbance value.

13. A press machine comprising:

a cushion shaft connected to a lower die;

a press shaft connected to an upper die and configured to press a workpiece between the upper die and the lower die in cooperation with the cushion shaft;

a motor configured to drive the upper die through a mechanical mechanism generating a steady disturbance in the press machine, the steady disturbance originating in change in a moment of inertia of the mechanical mechanism; and a motor control device configured to supply electric power to the motor and configured to detect an abnormal state in the press machine by discriminating an abnormal disturbance originating in a foreign object between the press shaft and the cushion shaft, and the steady disturbance, wherein the motor control device comprises a disturbance observer configured to calculate an estimated disturbance value with respect to the motor based on a torque command and a motor velocity of the motor, an absolute value calculator configured to receive the estimated disturbance value and to calculate an absolute value of the estimated disturbance value, an integrator configured to integrate the absolute value of the estimated disturbance value during a period in which the upper die is moved over a predetermined zone within a movable range of the upper die, and a comparator configured to sample an output of the integrator per predetermined time, to compare a current sampling value with a sampling value in a just preceding cycle or a further before cycle, and to determine, based on a comparison result, whether the foreign object is caught.

14. A press machine comprising:

a cushion shaft connected to a lower die;

a press shaft connected to an upper die and configured to press a workpiece between the upper die and the lower die in cooperation with the cushion shaft;

a motor configured to drive the upper die through a mechanical mechanism generating a steady disturbance in the press machine, the steady disturbance originating in change in a moment of inertia of the mechanical mechanism; and a motor control device configured to supply electric power to the motor and configured to detect an abnormal state in the press machine by discriminating an abnormal disturbance originating in a foreign object between the press shaft and the cushion shaft, and the steady disturbance, wherein the motor control device comprises a disturbance observer configured to calculate an estimated disturbance value with respect to the motor based on a torque command and a motor velocity of the motor, an absolute value calculator configured to receive the estimated disturbance value and to calculate an absolute value of the estimated disturbance value, a position coefficient processor configured to receive the absolute value of the estimated disturbance value and to assign a weight to the estimated disturbance value depending on a position of the upper die, an integrator configured to integrate an output of the position coefficient processor during a period in which the upper die is moved over a predetermined zone within a movable range of the upper die, and a comparator configured to sample an output of the integrator per predetermined time, to compare a current sampling value with a sampling value in a just preceding cycle or a further before cycle, and to determine, based on a comparison result, whether the foreign object is caught.

15. The press machine according to claim 14,
wherein the position coefficient processor has a function that changes a coefficient depending on a position of the upper die within a vertically movable range of the upper die such that the coefficient takes a value of 1 when the upper die is positioned at a bottom dead center, and takes a value gradually decreasing from 1 as the upper die is positioned farther away from the bottom dead center, and
wherein the position coefficient processor outputs a value calculated as a product of the coefficient decided based on the function and the absolute value of the estimated disturbance value.

16. The press machine according to claim 9, wherein when the motor control device detects the abnormal state of the press machine, the press machine outputs information indicating the abnormal state to an exterior.

* * * * *